No. 753,160. PATENTED FEB. 23, 1904.
C. H. RECKEFUS.
HORSESHOE ICE CREEPER.
APPLICATION FILED OCT. 28, 1903.
NO MODEL.
Fig. 1.
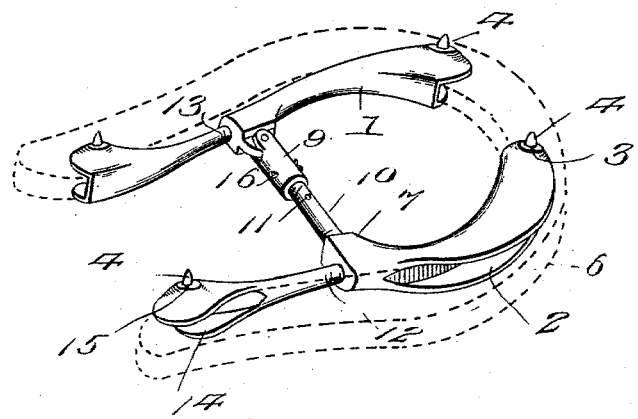
Fig. 2.
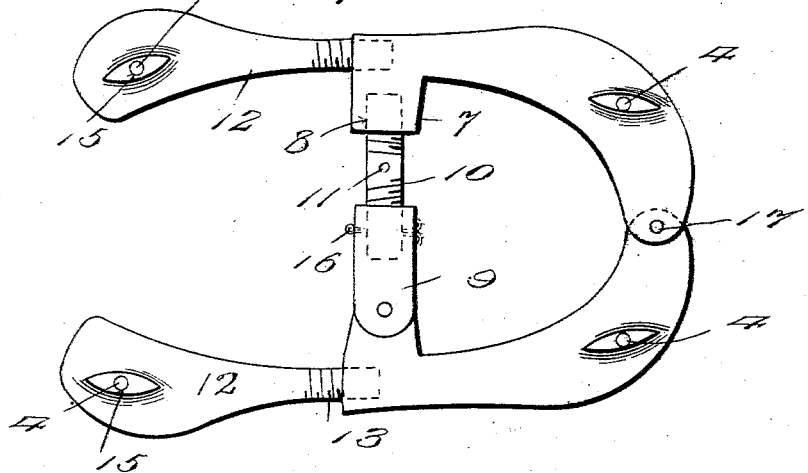
Fig. 3.
Witnesses
Inventor
Charles H. Reckefus,
By Victor J. Evans
Attorney No. 753,160.

Patented February 23, 1904.

UNITED STATES PATENT OFFICE.

CHARLES HAINES RECKEFUS, OF PORT DEPOSIT, MARYLAND.

HORSESHOE ICE-CREEPER.

SPECIFICATION forming part of Letters Patent No. 753,160, dated February 23, 1904.

Application filed October 28, 1903. Serial No. 178,854. (No model.)

*To all whom it may concern:*

Be it known that I, CHARLES HAINES RECKEFUS, a citizen of the United States, residing at Port Deposit, in the county of Cecil and State of Maryland, have invented new and useful Improvements in Horshoe Ice-Creepers, of which the following is a specification.

My invention relates to new and useful improvements in creepers for use in connection with horseshoes; and its object is to provide a simple and inexpensive device of this character which can be detachably connected to a horseshoe and which is adjustable to shoes of different sizes.

The invention consists in providing oppositely-curved members having adjustable extensions, and said members and extensions are grooved in their outer faces for the reception of the inner edges of the horseshoe. A tube is pivoted to one of the members and receives one end of a screw, the other end of which engages the other member of the creeper. The ends of this screw are threaded in opposite directions, so that by turning the same the members may be drawn toward or separated from each other. Each member of the creeper, as well as its adjustable extension, is provided with a calk or lug for engaging the ice or ground.

The invention also consists in the further novel construction and combination of parts hereinafter more fully described and claimed, and illustrated in the accompanying drawings, showing the preferred form of my invention, and in which—

Figure 1 is a perspective view of the creeper, a horseshoe being shown in position therearound by dotted lines. Fig. 2 is a plan view of a modified form of creeper, and Fig. 3 is a detail view of one of the calks.

Referring to the figures by numerals of reference, 1 1 are oppositely-curved members having grooves 2 in their outer faces, and apertures 3 are formed in one wall of each groove for the reception of a calk 4, having a head 5, which is adapted to be seated within the groove 2 and to bear upon one face of a horseshoe 6 after said horseshoe has been inserted into the grooves. Inwardly-extending portions 7 are formed at the other ends of the members 1, and one of them has a screw-threaded recess 8, while the other has a tube 9 pivoted thereto, said tube being adapted to receive the threaded end of a screw 10. The other end of this screw engages the recess 8, and the two ends are screw-threaded in opposite directions. An aperture 11 is formed in the screw for the reception of a nail or other similar device, whereby the screw may be readily turned in a desired direction. Extensions 12 project longitudinally from the members 1, and each extension has a screw-threaded portion 13, which projects into one of the members 1. The outer ends of these extensions are enlarged and grooved in their outer edges, as shown at 14, and in the wall of each of these grooves is an aperture 15 for the reception of a calk 4, such as hereinbefore described. A pin 16 is adapted to be inserted through the tube 9 and the screw 10, so as to lock the same against rotation after it has been adjusted.

In attaching the creeper to a horseshoe the screw 10 is turned, so as to draw the tube 9 toward the oppositely-arranged portion 7, and the creeper is then placed within the horseshoe and the rotation of the screw 10 reversed. The members 1 and the extensions 12 are thus forced in opposite directions, and the grooves therein receive the inner edges of the horseshoe, and said shoe holds the calks 4 securely in position in the apertures 3 and 15. After the creeper has been securely fastened in place in this manner the pin 16 can be inserted in the tube 9 and the screw 10, so as to prevent said screw from turning. If desired, the members 1 can be pivoted together, as shown at 17 in Fig. 2.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. A creeper comprising oppositely-arranged grooved members, grooved extensions adjustably connected thereto, and means for adjusting the extensions longitudinally in relation to the members.

2. A creeper comprising oppositely-arranged grooved curved members, grooved extensions adjustably connected thereto, calks extending from the members and the extensions, and means for adjusting said extensions longitudinally in relation to the members.

3. A device of the character described comprising oppositely-arranged members having grooves therein for the reception of a horseshoe, extensions longitudinally adjustable in relation to the members and having horseshoe-receiving grooves, calks extending from the members and their extensions, and means for adjusting said members from or toward each other.

4. A device of the character described comprising oppositely-arranged members having horseshoe-receiving grooves therein, calks detachably seated within the members and adapted to be retained in positions by the horseshoe, extensions adjustably connected to the members and having horseshoe-receiving grooves, and means for adjusting the members from or toward each other.

5. A device of the character described comprising oppositely-arranged members having horseshoe-receiving grooves, extensions adjustably connected to the members and having horseshoe-receiving grooves therein, calks within the members and extensions and adapted to be retained in position by a horseshoe, a tube connected to one of the members, and a recessed extension integral with the other member, and an oppositely-threaded screw engaging said extension and the tube.

6. A device of the character described comprising oppositely-arranged members pivoted togther and having horseshoe-receiving grooves in their outer faces, extensions adjustably connected to the members and having grooves therein, calks detachably arranged within the members and extensions and adapted to be retained therein by a horseshoe, a tube pivoted to one of the members, a recessed extension integral with the other member, and an oppositely-threaded screw engaging the tube and recessed extension, respectively.

In testimony whereof I affix my signature in presence of two witnesses.

CHARLES HAINES RECKEFUS.

Witnesses:
R. C. HOPKINS,
J. F. C. HOPKINS, Jr.